US011258183B2

(12) United States Patent
Socransky

(10) Patent No.: US 11,258,183 B2
(45) Date of Patent: Feb. 22, 2022

(54) METHOD AND APPARATUS FOR MOLDABLE MATERIAL FOR TERRESTRIAL, MARINE, AERONAUTICAL AND SPACE APPLICATIONS WHICH INCLUDES AN ABILITY TO REFLECT RADIO FREQUENCY ENERGY AND WHICH MAY BE MOLDABLE INTO A PARABOLIC OR RADIO FREQUENCY REFLECTOR TO OBVIATE THE NEED FOR REFLECTOR CONSTRUCTION TECHNIQUES WHICH PRODUCE LAYERS TO SUSCEPTIBLE TO LAYER SEPARATION AND SUSCEPTIBLE TO FRACTURE UNDER EXTREME CIRCUMSTANCES

(71) Applicant: Alexander Socransky, Los Angeles, CA (US)

(72) Inventor: Alexander Socransky, Los Angeles, CA (US)

( * ) Notice: Subject to any disclaimer, the term of this patent is extended or adjusted under 35 U.S.C. 154(b) by 0 days.

(21) Appl. No.: 17/180,476

(22) Filed: Feb. 19, 2021

(65) Prior Publication Data
US 2021/0175632 A1 Jun. 10, 2021

Related U.S. Application Data

(62) Division of application No. 16/588,668, filed on Sep. 30, 2019.

(51) Int. Cl.
*H01Q 15/14* (2006.01)
*B29B 7/90* (2006.01)
(Continued)

(52) U.S. Cl.
CPC ............ *H01Q 15/141* (2013.01); *B29B 7/90* (2013.01); *B29C 41/003* (2013.01); *B29C 41/08* (2013.01);
(Continued)

(58) Field of Classification Search
CPC ...... H01Q 15/141; C08K 3/046; B29C 41/12; B29C 41/003; B29C 41/08;
(Continued)

(56) References Cited

U.S. PATENT DOCUMENTS 4,897,151 A * 1/1990 Killackey ................ C23F 1/02
216/13
6,664,939 B1 * 12/2003 Olinyk ................ H01Q 15/142
29/600

(Continued)

OTHER PUBLICATIONS

Weston Harley, Why are satellite dishes parabolic?, Jan. 24, 2004, University of Regina (Year: 2004).*

*Primary Examiner* — Francisco W Tschen
*Assistant Examiner* — Elisa H Vera
(74) *Attorney, Agent, or Firm* — Olivo IP Law Group, P.C.; John W. Olivo, Jr.

(57) ABSTRACT

The present invention is a unique process of manufacturing rigid members with precise "shape keeping" properties and with reflective properties pertaining to radio frequency energy, so that air, land, sea and space devices or vehicles may be constructed including parabolic reflectors formed without discrete permanent layering. Rather, such parabolic reflectors or similarly, vehicles, may be formed by homogeneous construction where discrete layering is absent, and where energy reflectivity or scattering characteristics are embedded within the homogeneous mixture of carbon nanotubes and associated graphite powders and epoxy, resins and hardeners. The mixture of carbon graphite nanofiber and carbon nanotubes generates higher electrode conductivity and magnetized attraction through molecular polarization. In effect, the rigid members may be tuned based on the application. The combination of these materials creates a unique matrix that is then set in a memory form at a specific temperature, and then applied to various materials through a (Continued)

series of multiple layers, resulting in unparalleled strength and durability.

20 Claims, 9 Drawing Sheets

(51) Int. Cl.
| | |
|---|---|
| B29D 11/00 | (2006.01) |
| H01Q 15/16 | (2006.01) |
| C08K 3/04 | (2006.01) |
| B29C 41/00 | (2006.01) |
| B29C 41/08 | (2006.01) |
| B29C 41/12 | (2006.01) |
| B29K 105/16 | (2006.01) |
| B29K 507/04 | (2006.01) |
| B29L 11/00 | (2006.01) |
| B29L 31/30 | (2006.01) |
| C08K 7/06 | (2006.01) |
| C08J 3/20 | (2006.01) |

(52) U.S. Cl.
CPC .......... *B29C 41/12* (2013.01); *B29D 11/0074* (2013.01); *C08J 3/203* (2013.01); *C08K 3/04* (2013.01); *C08K 3/041* (2017.05); *C08K 3/046* (2017.05); *C08K 7/06* (2013.01); *H01Q 15/16* (2013.01); *B29K 2105/167* (2013.01); *B29K 2507/04* (2013.01); *B29L 2011/0083* (2013.01); *B29L 2031/3067* (2013.01); *B29L 2031/3076* (2013.01); *B29L 2031/3097* (2013.01); *C08K 2201/001* (2013.01); *C08K 2201/011* (2013.01); *C08K 2201/014* (2013.01)

(58) Field of Classification Search
CPC ..... B29L 2031/3076; B29L 2031/3067; B29L 2031/3097
See application file for complete search history.

(56) References Cited

U.S. PATENT DOCUMENTS

| | | | | |
|---|---|---|---|---|
| 6,783,709 | B2* | 8/2004 | Harreld | C08G 77/452 264/36.1 |
| 2002/0008956 | A1* | 1/2002 | Niu | H01G 11/40 361/502 |
| 2003/0174802 | A1* | 9/2003 | Hare | G21F 1/106 376/287 |
| 2006/0270301 | A1* | 11/2006 | Marks | H01Q 15/141 442/316 |
| 2010/0178487 | A1* | 7/2010 | Arai | B32B 27/12 428/300.1 |
| 2010/0203351 | A1* | 8/2010 | Nayfeh | C03C 4/12 428/622 |
| 2011/0240064 | A1* | 10/2011 | Wales | C09D 7/47 134/26 |
| 2016/0031164 | A1* | 2/2016 | Downs | B29C 33/68 428/12 |
| 2016/0051939 | A1* | 2/2016 | Choi | B01D 69/122 210/500.3 |
| 2020/0172399 | A1* | 6/2020 | Susantyoko | B29C 39/06 |

* cited by examiner

Carbon Nanotube

Graphite / Graphene Powder

METHOD AND APPARATUS FOR MOLDABLE MATERIAL FOR TERRESTRIAL, MARINE, AERONAUTICAL AND SPACE APPLICATIONS WHICH INCLUDES AN ABILITY TO REFLECT RADIO FREQUENCY ENERGY AND WHICH MAY BE MOLDABLE INTO A PARABOLIC OR RADIO FREQUENCY REFLECTOR TO OBVIATE THE NEED FOR REFLECTOR CONSTRUCTION TECHNIQUES WHICH PRODUCE LAYERS TO SUSCEPTIBLE TO LAYER SEPARATION AND SUSCEPTIBLE TO FRACTURE UNDER EXTREME CIRCUMSTANCES

PRIORITY CLAIMS

This application is a divisional of U.S. patent application Ser. No. 16/588,668, filed Sep. 30, 2019, the contents of which are incorporated herein by reference.

BACKGROUND OF THE INVENTION

This invention relates to a new and improved way to form various devices or vehicles from a new and novel composition, which may be molded into a parabolic reflector or analogous radio frequency reflector. More specifically, according to the present invention, a parabolic reflector may be formed, consisting of a unique blend of materials such as carbon nanotubes, carbon nanofibers and graphite powder and/or other magnetized segments, all embedded and disposed within a novel mix of a resin and a corresponding hardener, whereby the carbon nanotubes, carbon nanofibers and graphite powder form a matrix within the material capable of reflecting radio-frequency radiation and adding to the overall strength of the device formed. Carbon nanotubes may be formulated in many ways so as a matter of design choice, they may be conductive in various degrees and polarizations. By utilizing carbon nanotubes in one format or another, unique mixtures of material yield an enhanced and completely new and improved result, so that parabolic reflectors need not be formed with embedded mesh elements that can separate within a laminate and need not be formed by a layer by layer approach whereby each layer is fused to another while the various layers remain discrete.

A parabolic reflector is a reflective surface that is used to collect and direct wave energy, such as light, electromagnetic waves, sound or radio waves. The use of a parabolic reflector to reflect light can be seen in various laser and material processing applications, as well as in the fields of optics, security systems, and laser-based medical procedures. Due to a high level of durability in extreme conditions, parabolic reflectors are also primarily used to reflect and direct satellite signals. Parabolic reflector satellite technology can have numerous applications in the fields of aerospace, defense, satellite communications, and industrial manufacturing.

Current parabolic reflector technology is made up of non-homogenous layered patterns, where there are separate composition layers. It is common to use a mesh overlay or a single layer for electromagnetic reflection. The premise of parabolic reflector technology is the use of a reflecting metallic mesh that is stabilized or embedded within or encapsulated within a dielectric, such as plastic or fiberglass. Another prior art method of manufacture includes the use of a layer by layer build-up of metallic layers disposed upon a dielectric layer or multiple dielectric layers. However, the result is still that of one layer affixed to the two adjacent layers—layer by layer—which results in potential deformity and a loss in structural integrity.

An example of the current state of the art is referenced by U.S. Pat. No. 4,860,023 (Halm), whereby a method for manufacturing a parabolic reflector antenna by means of multiple insulating layers is disclosed.

SUMMARY OF THE INVENTION

The present invention is a unique process of manufacturing a parabolic reflector, through the use of materials such as carbon nanotubes, carbon nanofibers, graphene/graphite powders, and among the conductive-magnetized segments are the carbon nanotubes. The mixture of carbon nanofiber (sometimes called nanopowder) and carbon nanotubes generates higher electrode conductivity and magnetized attraction through molecular polarization. The combination of these materials creates a unique matrix or slurry that is then dispersed upon a forming surface to introduce a shape into the memory of the dried slurry when a certain state of dryness is achieved, and then this slurry application process is repeated over and over to build up the thickness of the overall reflective device being formed. By the term "application", it's a matter for those of skill in the art to decide how to apply material upon the forming surface as a myriad of possibilities exist including brushing material onto the forming surface, spraying it, pouring it, and so forth. In addition, the material may also include other compatible additives such as a carbon fiber woven fabric, a carbon Kevlar woven fabric, other compatible weaves available commercially, including even a fiberglass weave in certain situations.

Through this method, a parabolic reflector epoxy matrix is created, whereby the reflective properties and physical shape are embedded into the actual mix. Importantly, for the first time ever, a mix is formed so that the resulting parabolic reflector ends up as a truly homogeneous member, without discernable discrete layering which can decrease strength and introduce errors into the shape of the surface.

In accordance with the preferred embodiment of the present invention, the reflective epoxy matrix is applied onto a forming surface or mold that defines the shape and size of the parabolic reflector. However, the choice to apply the slurry over and over building up the overall thickness is one of a construction manufacturing preference. In addition, the same process and method may be used to form other devices aside from parabolic reflectors as discussed herein, and in each case, the number applications of the slurry upon the forming surface will vary. The slurry may be brushed onto the forming surface or more or less poured on, as the resulting molded member is homogeneous. That is, no layering exists within the finished product. The epoxy matrix can be applied to various materials which form the shaping surface, including but not limited to stainless steel, aluminum, wood, or plaster. The reflective epoxy matrix mixture (or slurry) contains all the active ingredients according to the present invention and is applied to the desired sides of the underlying shaping surface, followed by successive applications of the slurry, over and over, allowing the slurry to set and dry upon the shaping surface. Once each application of slurry is applied upon the forming surface more and more applications will result in a thicker device upon the forming surface, as a matter of design choice. Prior to the process of applying the slurry upon the forming surface, carbon nanotubes, carbon nanofibers and graphite powder are mixed in with the resin and hardener. In the end, the slurry forms into a reflective epoxy matrix upon the forming surface and dries to create an even surface.

In one embodiment of the present invention, the epoxy matrix can be built up in terms of its thickness when applied upon a forming surface with a brush. Once the epoxy matrix and included fibers have cured to a point, the process of building up the overall thickness of the device upon the forming surface can be repeated to increase its thickness. This process of applying multiple applications provides reinforcement through a hexagon-like structure, similar to a honeycomb. Once the desired number of applications has been dispersed upon the forming surface, the proposed mix of materials and matrix may be subjected to temperature variation or other methods to dry or cure the overall slurry containing the reflective matrix. This can be done through the use of a drying apparatus such as, for example, a heat chamber. Once the slurry has hardened, the dried material has physical shape memory and becomes a parabolic reflector. This reflector may be tuned using size and thickness of the nanotube structures, in a manner known to those in the art. It can be tuned to be used in the electromagnetic radiation spectrum, weather to reflect, absorb and even discharge radio-frequency energy when necessary. It is a matter of design choice as to how tuning may be accomplished, with nanotubes of smaller sizes used to create higher reflection at higher frequencies for tuning precision and predictably, longer tubes can start absorbing certain longer-length nanometer waves and then they discharge as they fill. That is, a capacitive or storage effect is advantageously created.

Traditional parabolic reflector design encompasses forming a reflector and then encasing "it" within a rigid dielectric such as fiberglass or a traditional carbon fiber cured or formed parabolic plate, and then dispersing the reflective layer upon the formed member. According to the present invention, for the first time ever the reflective aspect of the parabolic reflector may be formed within and as an integral homogeneous part of the rigid parabolic form or shape holding member. This is accomplished via the following steps. First, a parabolic shape or form is manufactured called a forming surface, perhaps out of aluminum or stainless steel, and perhaps in quadrants with each quadrant shaped to be mated together with the others to complete the parabolic reflector shape. Next, a low viscosity resin and associated hardener are disposed onto the forming surface, along with super conductive carbon black nanofiber and carbon nanotubes, mixed together. Importantly, it is worth noting that carbon nanotubes are available with a myriad of compositions and resulting conductivity characteristics and polarizations. By using carbon nanotubes of one type or another, along with the carbon nanofiber, alignments will form within the resin and in turn form a strong substance with uniform reflectivity throughout the homogeneous substance. In this manner, a homogeneous substance forms which is moldable to any desired shape and any desired conductivity characteristic. For a parabolic reflector formed this way, the material is reflective of radio-frequency radiation, while when used to form a stealth aircraft, the same method can be used to make the material absorb or scatter radio-frequency radiation.

Carbon nanotubes are cylindrical molecules that consist of rolled-up sheets of single-layer carbon atoms (graphene). They can be single-walled with a diameter of less than 1 nanometer (nm) or multi-walled, consisting of several concentrically interlinked nanotubes, with diameters reaching more than 100 nm. Their length can reach several micrometers or even millimeters.

Like their building block graphene, carbon nanotubes are chemically bonded with in extremely strong forms of molecular interaction. This feature combined with carbon nanotubes' natural inclination to rope together via van der Waals forces, provide the opportunity to develop ultra-high strength, low-weight materials that possess highly conductive electrical and thermal properties. This makes them highly attractive for numerous applications.

The rolling-up direction (rolling-up or chiral vector) of the graphene layers determines the electrical properties of the nanotubes. Chirality describes the angle of the nanotube's hexagonal carbon-atom lattice. Accordingly, armchair nanotubes, so called because of the armchair-like shape of their edges, have identical chiral indices and are highly desired for their perfect conductivity. They are unlike zigzag nanotubes, which may be semiconductors. Turning a graphene sheet a mere 30 degrees will change the nanotube it forms from armchair to zigzag or vice versa.

While multi-walled carbon nanotubes are always conducting and achieve at least the same level of conductivity as metals, single walled carbon nanotubes conductivity depends on their chiral vector: they can behave like a metal and be electrically conducting; display the properties of a semi-conductor; or be non-conducting. For example, a slight change in the pitch of the helicity can transform the tube from a metal into a large-gap semiconductor.

It is worth noting that carbon nanotubes are different than carbon nanofibers. Carbon nanofibers are usually several micrometers long and have a diameter of about 200 nm. Carbon fibers have been used for decades to strengthen various compounds, but they do not have the same lattice structure as carbon nanotubes. Instead, they consist of a combination of several forms of carbon and/or several layers of graphite, which are stacked at various angles on amorphous carbon (where atoms do not arrange themselves in ordered structures). Carbon nanofibers and nanotubes have similar properties, but the fibers tensile strength is lower owing to their variable structure and the fact they are not hollow inside.

Carbon nanotubes are well-suited for virtually any application requiring high strength, durability, electrical conductivity, thermal conductivity and lightweight properties compared to conventional materials. Currently, carbon nanotubes are mainly used as additives to synthetics. Carbon nanotubes are commercially available as a powder, i.e. in a highly tangled-up and agglomerated form. For carbon nanotubes to unfold their particular properties they need to be untangled and spread evenly in the substrate.

Another requirement is that carbon nanotubes need to be chemically bonded with the substrate, e.g. a plastic material. For that purpose, carbon nanotubes are functionalized, i.e. their surface is chemically adapted for optimal incorporation into different materials and for the specific application in question.

Carbon nanotube enabled nanocomposites have received much attention as a highly attractive alternative to conventional composite materials due to their mechanical, electrical, thermal, barrier and chemical properties such as electrical conductivity, increased tensile strength, improved heat deflection temperature, or flame retardancy.

These materials promise to offer increased wear resistance and breaking strength, antistatic properties as well as weight reduction. For instance, it has been estimated that advanced carbon nanotube composites could reduce the weight of aircraft and spacecraft by up to 30%. These composite materials already find use in:
1. sporting goods (bicycle frames, tennis rackets, hockey sticks, golf clubs and balls, skis, kayaks; sports arrows);
2. yachting (masts, hulls and other parts of sailboats);
3. textiles (antistatic and electrically conducting textiles (smart textiles'); bullet-proof vests, water-resistant and flame-retardant textiles);
4. automotive, aeronautics and space (light-weight, high-strength structural composites);
5. industrial engineering (e.g. coating of wind-turbine rotor blades, industrial robot arms); and
6. electrostatic charge protection (for instance, researchers have a developed electrically conducting.

With the present invention with respect to forming parabolic reflectors, various active ingredients or discrete members become mixed and shaken to form a uniform homogeneous substance. Conversely, with the prior art, the formation process is viewed as to create a reflective layer and then encapsulate that reflective layer with some dielectric or stiff coating. Conversely, according to the present invention, the carbon nanofiber and carbon nanotubes become immersed within the overall mix which includes a resin to form a slurry which may be applied to the parabolic forming surface after all components of the slurry have been shaken and mixed to form a reflective matrix as a part of the overall homogeneous device being formed. Before the slurry is applied to the shaping surface, a hardener is added into the slurry so as to harden or cure the matrix so that the finished product retains its formed shape (akin to pouring a pancake upon a griddle to form it). Depending upon the application, various ingredients may be augmented within the mix or slurry, while with other applications certain other materials may be reduced or even eliminated. For extra strength and reflectivity, graphite powder is added to the mixture, and then finally, a hardener which causes the resin or epoxy to permanently harden and form a parabolic shaped reflector. Traditional parabolic reflectors have layers, some of which are conductive and some of which are not. Conversely, with the present invention, the carbon nanotubes, carbon nanofibers and graphite powders (or graphene powders generally) are all dispersed throughout the entire parabolic reflector. In that manner, the entire reflective member is reflective throughout its structure and achieves a maximum strength and durability, without any fear of layer separation in most extreme conditions. By following this process, a lightweight substance may be manufactured, which possesses tremendous strength, has a very light weight, and is tuned to a specific frequency. So, for parabolic reflectors, the substance manufactured according to the present invention may be tuned to the radio frequency of interest (e.g., Ka band, etc.) or when used for maritime or aeronautical applications, the substance may be made to absorb electro-magnetic signals like a capacitor and then discharge that stored energy into a different medium to create such effect to such as scatter radar signals intended to locate said assets. The stored energy may be distributed to various subsystems within the vehicle or vessel composed of the novel material according to the present invention.

In accordance with the preferred embodiment of the present invention, the application of a release layer between the shaping surface and the epoxy matrix (or slurry) containing the inter-carbon fiber parabolic reflectivity characteristic forms a demarcation point, whereby the substances are separated prior to usage of the parabolic reflector produced.

The present invention can be used in the construction of maritime vessels and aircraft, as in such by itself, based on its inherent memory characteristics may be used in areas where impact resistance is desired, and memory of the shape of the material will reset after impact to a certain level, it may possibly be used in earthquake construction reinforcement, or in maritime applications or for other hard impacted vehicles and so forth. Where the material will have memory after such impact and go back to the shape it was formed in. with very little or no degradation in shape. Such as radar scattering stealth aircraft technology. In addition, spacecraft or subterranean vessels may be constructed in this matter as well. Air, land and sea all demand applications where the scattering of radio frequency energy may be desired, either for stealth operation or tuned focusing for communications. The resulting member has unparalleled strength, resiliency, light weight characteristics, and an amazing ability to "keep its precise" shape, which is critical for microwave communications systems where wavelengths are very minute.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE PREFERRED EMBODIMENT

Figure 1A:
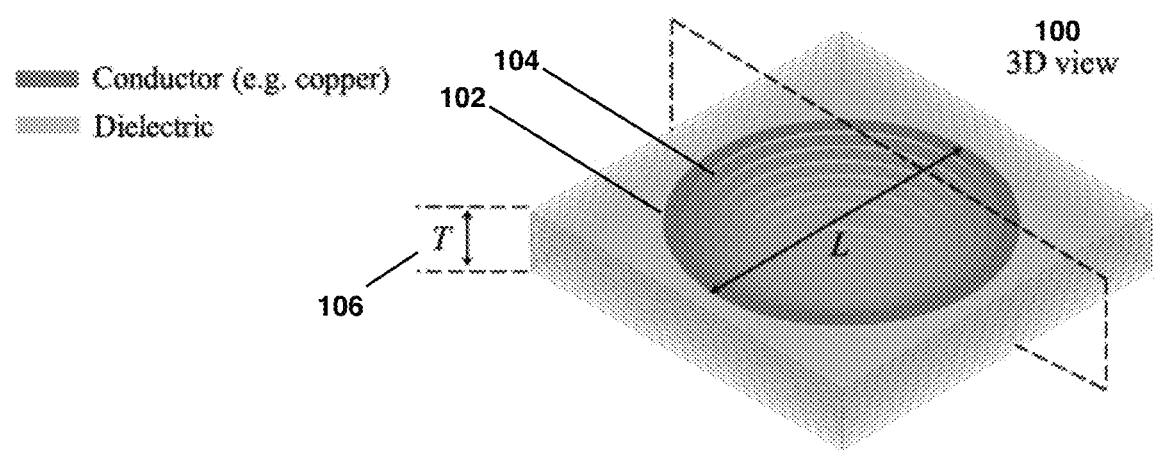
FIG. 1A is a three-dimensional view of a typical multi-layer parabolic reflector.
Figure 1B:
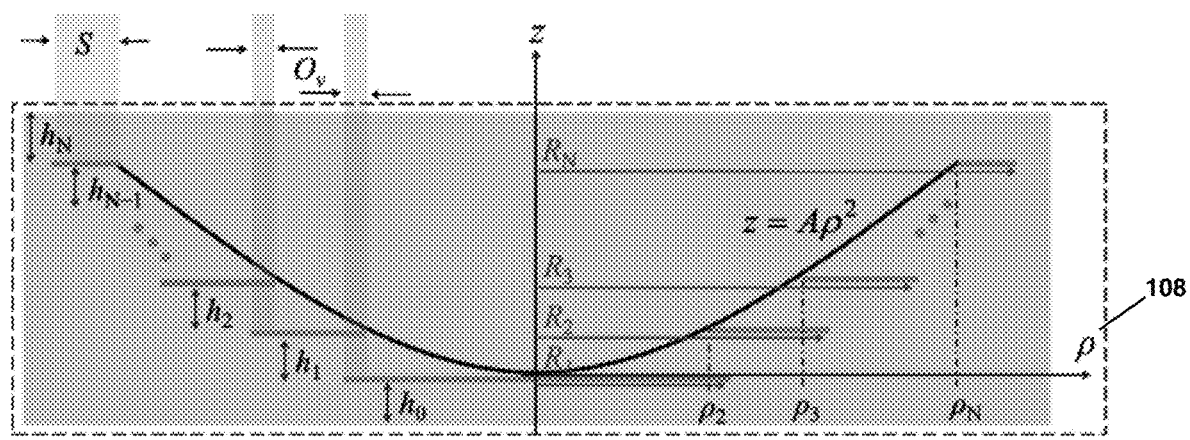
FIG. 1B is a lateral view of the parabolic reflector in FIG. 1A.

In accordance with traditional methods for manufacturing parabolic reflectors, FIG. 1A depicts a parabolic assembly surface 102 made by quasi-parabolic reflector surfaces made of concentric strip rings in a multilayer substrate 104 (p represents the axes in the plane of the substrate which can be x or y 110) where T represents the total thickness of the substrate 106. FIG. 1A shows a three-dimensional view 100 of a parabolic reflector. FIG. 1B shows a lateral view 108 of the parabolic reflector in FIG. 1A.

In accordance with alternatives to the processes depicted in FIG. 1, other corresponding techniques have been used in the parabolic reflector manufacturing process, wherein various techniques have been used to achieve the integration of layered or sandwiched dissimilar materials, such as metallic inserts, adjacent various dielectric layers. In no case do prior art methods achieve the result of the present invention which enables the overall parabolic reflector to be formed from a single mixture of slurry, to form a homogeneous reflector, which possesses uniform levels of reflective throughout its cross-section and entire volume. Consequently, efficiency, signal to noise ratio and durability, strength and light weight design are all maximized in a streamlined simple manufacturing process.

Figure 2A:
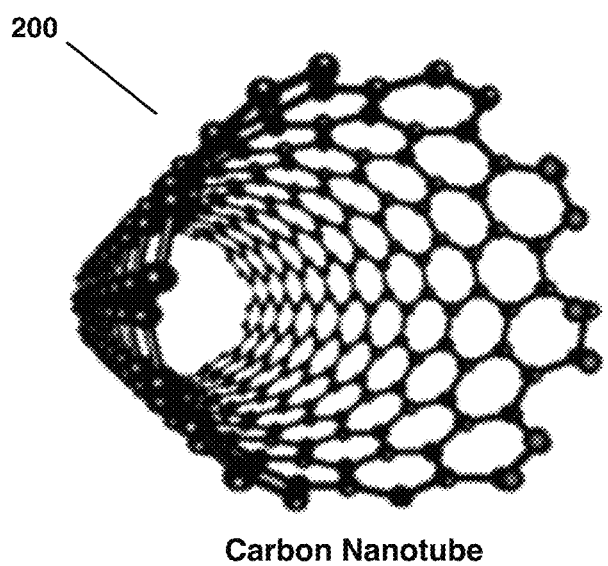
FIG. 2A is a rendering of a carbon fiber nanotube arrangement.
Figure 2B:
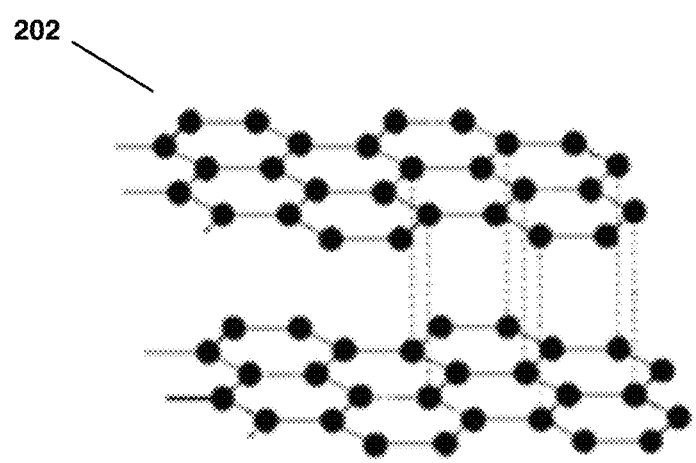
FIG. 2B is a rendering of a graphite or graphene powder arrangement.
Figure 3:
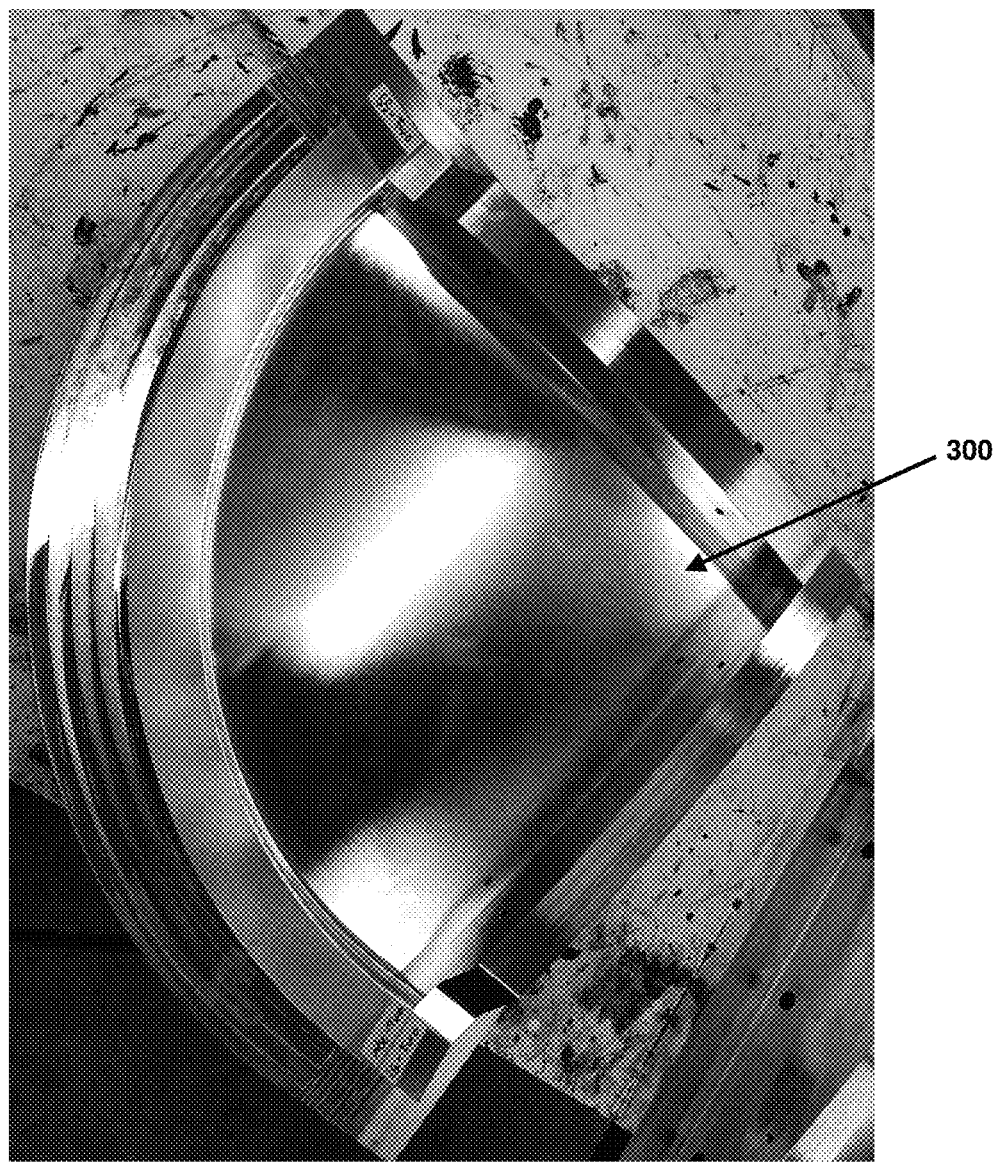
FIG. 3 is an image of one step in connection with the present invention.

FIGS. 2 A-B are renderings of carbon fiber materials used in connection with the present invention. In accordance with the preferred embodiment of the present invention, the epoxy matrix of the present invention requires materials such as conductive carbon black nanofibers and/or carbon nanotubes 200, as shown in the rendering of FIG. 2A, and graphite or graphene powder 202, as shown in the rendering of FIG. 2B. To clarify this process, in order to practice the present invention, a manufacturer would start with a parabolic shaped forming surface 300 as shown in FIG. 3. That shaping surface is simply the shape of the article you wish to create: a parabolic reflector or a parabolic reflector broken up into four petals or quadrants that may be bolted together, a maritime vessel, a spacecraft, an aviation asset, building supplies particularly which are earthquake resistant, and so forth. The parabolic forming surface 300 may be made of any material desired such as wood, plaster, stainless steel, aluminum, or any other material suitable for accepting a coating containing the desired elements. The forming surface 300 may be sprayed or otherwise coated prior to application of the reflective resin material (slurry) according to the present invention, again, much like a griddle may be coated prior to cooking a pancake. Such a coating acts as a "release material" so that the formed member or parabolic reflector portion or unit may easily be separated from the forming surface 300. Upon that forming surface is applied a low viscosity resin (or epoxy), carbon nanotubes and/or carbon nanofibers 200, graphite powder (or a graphene powder) 202, and then finally, while heated, a hardener is added to allow the hardening or curing process to lock into place the desired shape of the article desired to be manufactured. Alternatively, a heat box may be used to cure the slurry into the finished product. The hardener is selected to correspond with the resin chosen, such that the resin and hardener act in concert with the carbon nanotubes, carbon nanofibers, and graphite powder to form a homogeneous parabolic reflector unit or portion thereof.

FIG. 3 is an image of a shaping surface used in connection with shaping a parabolic reflector surface according to the present invention. In accordance with the preferred embodiment, the epoxy mixture or slurry is applied upon the shaping surface 300 so that upon hardening, a parabolic reflector may be formed of before unheard-of characteristics. The parabolic reflector slurry is applied to a mold or forming surface 300 as displayed in FIG. 3 and as it dries and cures, the hardener contained within it produces the desired result, much the way pancake batter is formed on a cooking skillet. The ingredients all disperse themselves throughout the finished article.

Figure 4:
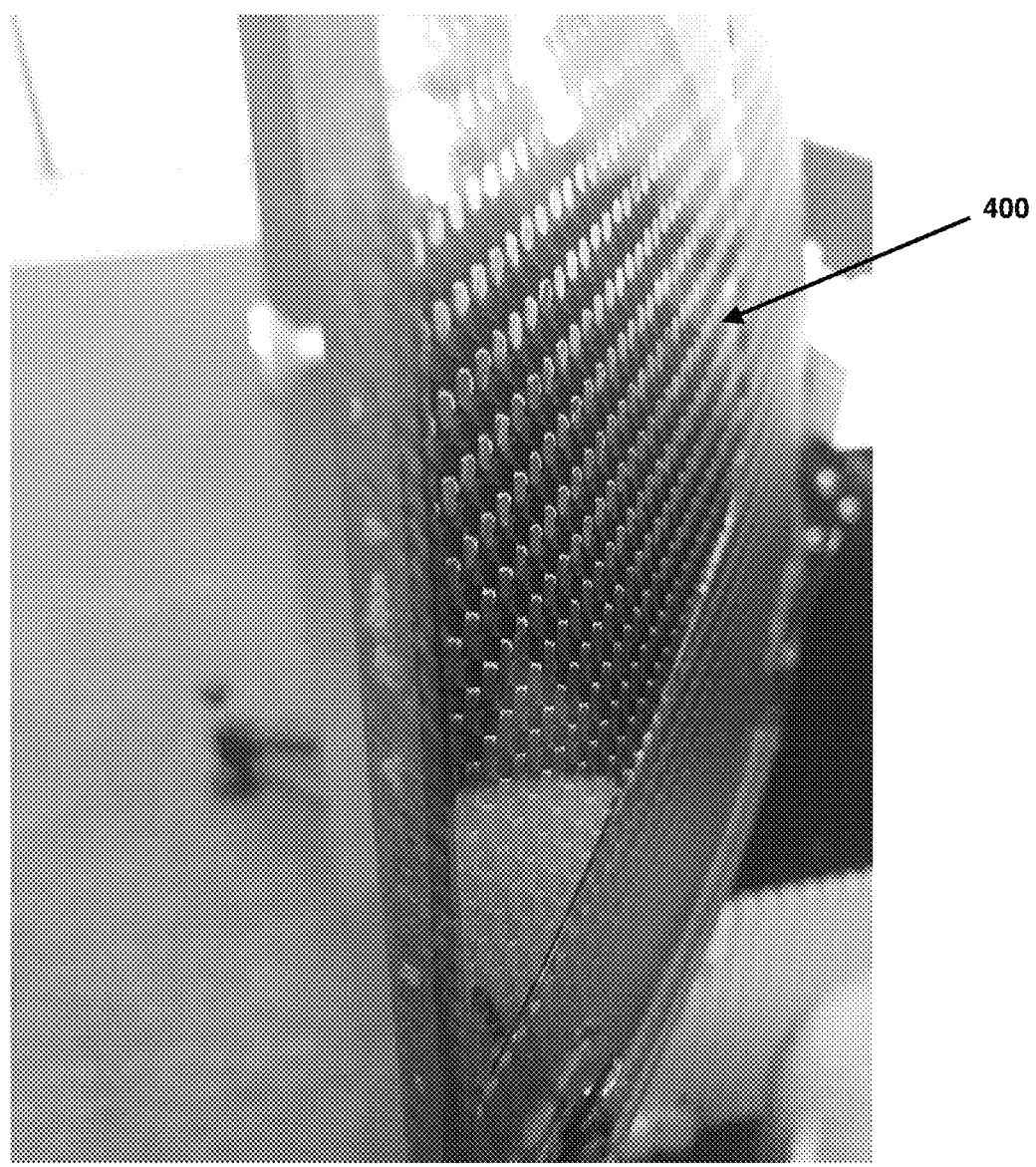
FIG. 4 is an image of another manufacturing step in connection with the present invention.

FIG. 4 is an image of a step according to the present invention. In accordance with the preferred embodiment of the present invention, the slurry possessing the required or desired reflective characteristics are applied to the forming surface. One important ingredient in the slurry is an epoxy resin, which mix with the carbon nanotubes, carbon nanofiber and graphite powders to create the finished parabolic reflector 400 as shown in the image of FIG. 4. Importantly, the carbon nanotubes align themselves naturally within the article being formed as they are polarized. The carbon nanofiber is similarly conductive, so it adheres to the carbon nanotubes and in turn, the graphite powder or graphene powder fills in the matrix so that the overall slurry has uniformly dispersed reflective properties distributed uniformly throughout the mixture of resin and hardener.

Figure 5:
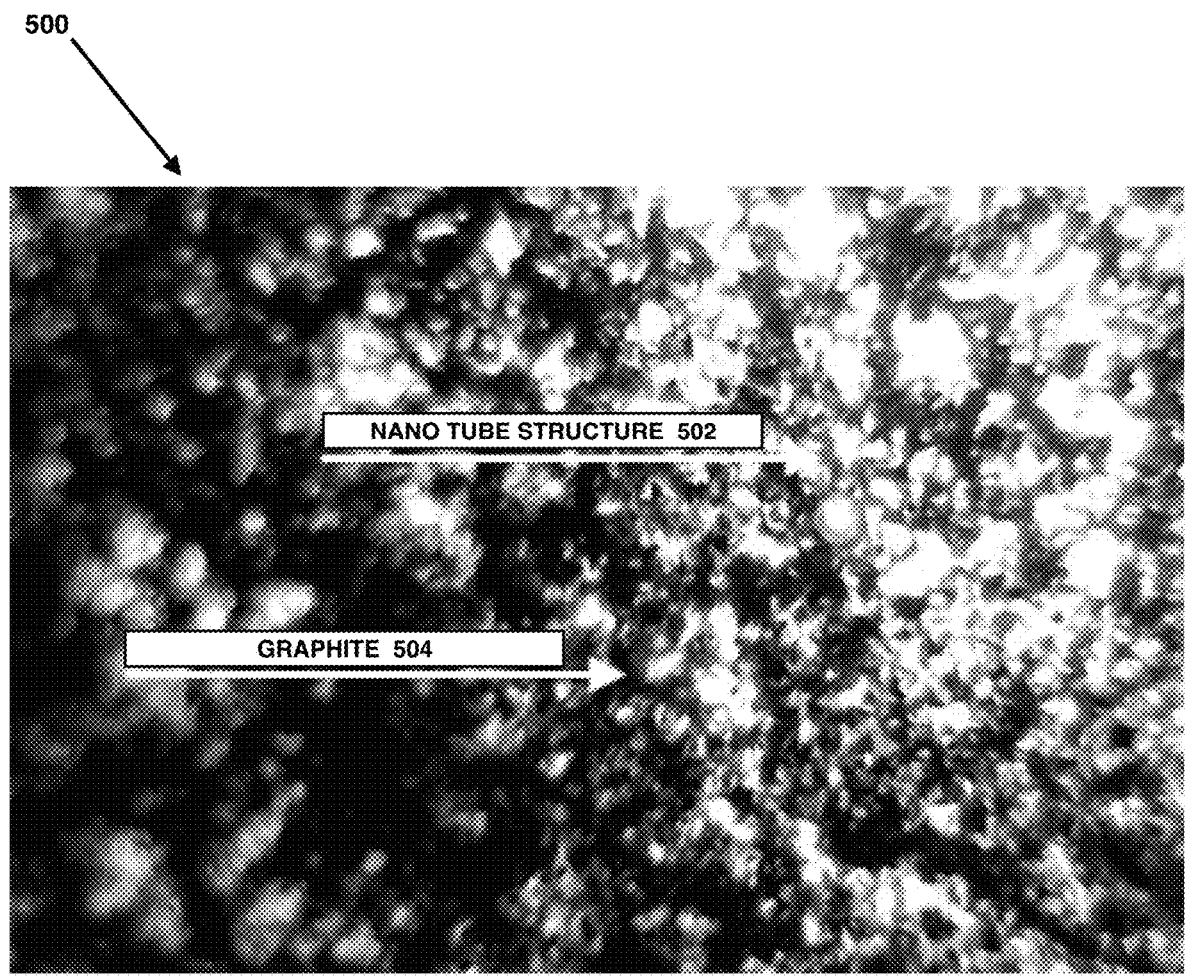
FIG. 5 is an image of the epoxy matrix and carbon nanotubes and graphite/graphene powered material formed by the present invention.

According to the present invention. In accordance with the preferred embodiment of the present invention, the epoxy matrix 500 of the parabolic reflector consists of a carbon fiber nanotube 502 and nanofiber structure and graphite powder 504, mixed together with resin and a hardener, as shown in the detailed image in FIG. 5.

Figure 6A:
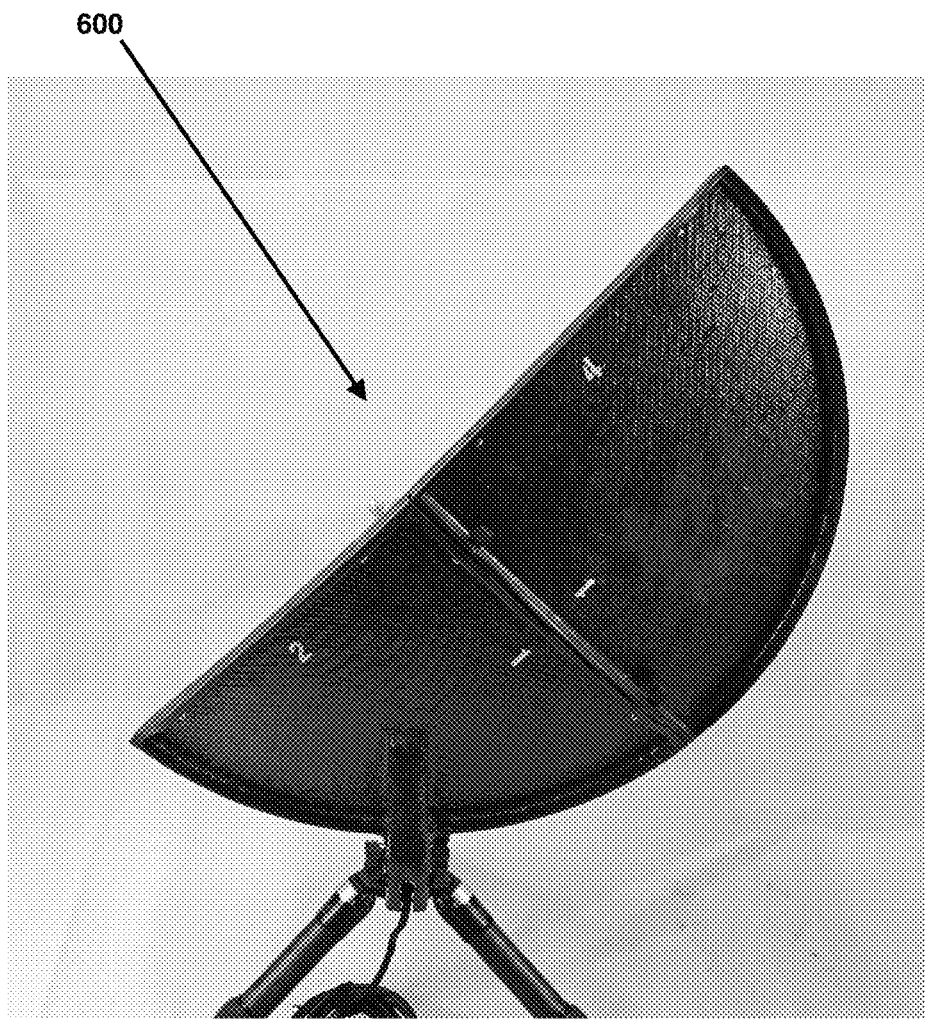
FIGS. 6A & 6B show a parabolic reflector as being assembled, 6A with two quadrants connected together and 6B at three of four quadrants joined together.
Figure 6B:
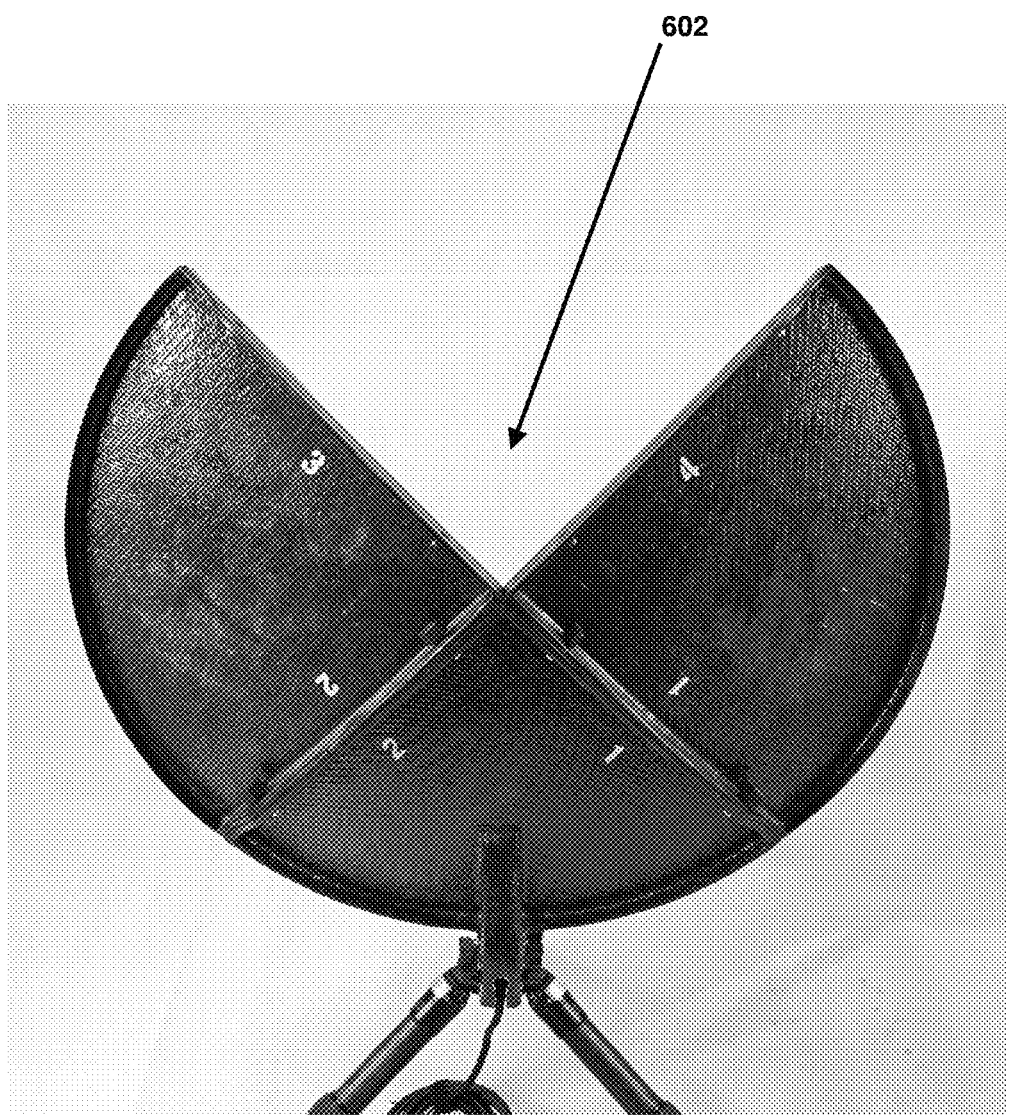

FIGS. 6A & 6B show a parabolic reflector as being assembled, 6A with two quadrants connected together 600 and 6B at three of four quadrants joined together 602, perhaps with bolts to secure the petals to one another. Of course, the parabolic reflector may be formed in one piece or in several pieces for assembly upon usage requirement. In the present embodiment, the parabolic reflector is shown made up of quadrants, so that it may be stored and transported in a portable fashion, easily brought onto an airplane, for example.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A manufacturing process for forming a parabolic reflector having a monolithic structure of uniform reflectivity without encapsulation of a forming surface wherein forming said parabolic reflector includes the following steps:
   a. blending together carbon nanotubes, carbon nanofiber, and a resin hardener under suitable conditions to form a cured conductive slurry;
   b. applying said curing conductive slurry to a shaped forming surface wherein said shaped forming surface is of a shape corresponding to a parabolic reflecting surface;
   c. allowing said curing conductive slurry to harden; and
   d. separating said parabolic reflector from said shaped forming surface without encapsulating a support structure for operation as a parabolic reflector of uniform reflectivity without encapsulation of said forming surface and wherein said parabolic reflector is formed to be substantially rigid and fixed into place as a mirror image of said shaped forming surface, and wherein said conductive slurry hardens to form said monolithic structure of uniform reflectivity.

2. The manufacturing process for forming a parabolic reflector according to claim 1 wherein said parabolic reflector is formed by a brush application of said slurry onto said shaped forming surface.

3. The manufacturing process for forming a parabolic reflector according to claim 1 wherein said parabolic reflector is formed by a pour application of said slurry onto said shaped forming surface.

4. The manufacturing process for forming a parabolic reflector according to claim 1 wherein said parabolic reflector is formed by a spray application of said slurry onto said shaped forming surface.

5. The manufacturing process of claim 1 wherein said cured conductive slurry forms a homogenous reflector.

6. The manufacturing process of claim 1 wherein said cured conductive slurry possesses uniform levels of reflectivity through its cross-section and entire volume.

7. The parabolic reflector manufacturing process of claim 1 wherein said carbon nanofibers become oriented with said carbon nanotubes to form an organized matrix.

8. The parabolic reflector manufacturing process of claim 1 wherein said monolithic structure is comprised of several concentrically interlinked carbon nanotubes.

9. The parabolic reflector manufacturing process of claim 1 wherein said carbon nanotubes are formed as armchair carbon nanotubes.

10. The parabolic reflector manufacturing process of claim 1 wherein said carbon nanotubes are formed as zigzag carbon nanotubes.

11. The parabolic reflector manufacturing process of claim 1 wherein said carbon nanotubes are single-walled.

12. The parabolic reflector manufacturing process of claim 1 wherein said carbon nanotubes are multi-walled.

13. The parabolic reflector manufacturing process of claim 1 wherein said parabolic reflector is chemically bonded with a substrate.

14. A manufacturing process for forming a parabolic reflector having a monolithic structure of uniform reflectivity without encapsulation of a forming surface wherein forming said parabolic reflector includes the following steps:
   a. blending together carbon nanotubes, carbon nanofiber and a resin hardener under suitable conditions to form a cured conductive slurry;
   b. applying said curing conductive slurry to a shaped forming surface wherein said shaped forming surface is of a shape corresponding to a parabolic reflecting surface;
   c. allowing said curing conductive slurry to harden; and
   d. separating said parabolic reflector from said shaped forming surface without encapsulating a support structure for operation as a parabolic reflector of uniform reflectivity without encapsulation of said forming surface, wherein said carbon nanofibers became oriented with said carbon nanotubes to form an organized matrix, wherein said monolithic structure is comprised of several concentrically interlinked carbon nanotubes, and wherein said parabolic reflector is formed to be substantially rigid and fixed into place as a mirror image of said shaped forming surface, and wherein said conductive slurry hardens to form said monolithic structure of uniform reflectivity.

15. A manufacturing process for forming a rigid material having a monolithic structure of uniform reflectivity without encapsulation of a forming surface wherein forming said structure includes the following steps:
   a. blending together carbon nanotubes, carbon nanofiber and a resin hardener under suitable conditions to form a cured conductive slurry;
   b. applying said curing conductive slurry to a forming surface wherein said forming surface is of a shape or pitch corresponding to a desired reflective surface;
   c. allowing said curing conductive slurry to harden; and
   d. separating a reflective surface from said shaped forming surface without encapsulation of said forming surface and without encapsulating a support structure for operation as desired, and wherein said reflective surface is formed to be substantially rigid and fixed into place as a mirror image of said shaped forming surface, and wherein said conductive slurry hardens to form said monolithic structure of uniform reflectivity.

16. The manufacturing process for forming a rigid material according to claim 15 wherein an underwater vehicle is formed from said rigid material.

17. The manufacturing process for forming a rigid material according to claim 15 wherein a maritime vehicle is formed from said rigid material.

18. The manufacturing process for forming a rigid material according to claim 15 wherein a terrestrial structure is formed from said rigid material.

19. The manufacturing process for forming a rigid material according to claim 15 wherein an aeronautical vehicle is formed from said rigid material.

20. The manufacturing process for forming a rigid material according to claim 15 wherein a spacecraft is formed from said rigid material.

* * * * *